United States Patent
Vuong (10) Patent No.: US 8,366,924 B2
(45) Date of Patent: *Feb. 5, 2013

(54) TWO STAGE NANOFILTRATION SEAWATER DESALINATION SYSTEM

(75) Inventor: Diem Xuan Vuong, San Clemente, CA (US)

(73) Assignee: City of Long Beach, Long Beach, CA (US)

( * ) Notice: Subject to any disclaimer, the term of this patent is extended or adjusted under 35 U.S.C. 154(b) by 1172 days.

This patent is subject to a terminal disclaimer.

(21) Appl. No.: 11/607,158

(22) Filed: Dec. 1, 2006

(65) Prior Publication Data

US 2007/0080113 A1   Apr. 12, 2007

Related U.S. Application Data

(63) Continuation of application No. 10/137,072, filed on May 2, 2002, now Pat. No. 7,144,511.

(51) Int. Cl.
*B01D 63/00* (2006.01)
*B01D 61/00* (2006.01)

(52) U.S. Cl. .......... 210/195.1; 210/257.2; 210/652; 210/639

(58) Field of Classification Search .......... 210/652, 210/195.2, 257.2, 641, 639, 653, 170, 195.1, 210/638

See application file for complete search history.

(56) References Cited

U.S. PATENT DOCUMENTS

| | | | |
|---|---|---|---|
| 3,133,132 A | 5/1964 | Loeb et al. | |
| 3,442,389 A | 5/1969 | Mendelson | |
| 3,457,170 A | 7/1969 | Havens | |
| 3,608,730 A | 9/1971 | Blaha | |
| 4,156,645 A | 5/1979 | Bray | |
| 4,239,624 A | 12/1980 | van Zon | |
| 4,434,057 A | 2/1984 | Marquardt | |
| 4,981,594 A | 1/1991 | Jones | |
| 5,238,574 A | 8/1993 | Kawashima et al. | |
| 5,310,486 A | 5/1994 | Green et al. | |
| 5,458,781 A | 10/1995 | Lin | |
| 5,520,816 A | 5/1996 | Kuepper | |
| 5,587,083 A | 12/1996 | Twardowski | |
| 5,670,053 A * | 9/1997 | Collentro et al. | 210/652 |
| 5,853,593 A * | 12/1998 | Miller | 210/652 |
| 5,858,240 A | 1/1999 | Twardowski | |
| 6,113,797 A * | 9/2000 | Al-Samadi | 210/652 |

(Continued)

FOREIGN PATENT DOCUMENTS

JP  55-31459  3/1980
JP  5-269463  10/1993

(Continued)

OTHER PUBLICATIONS

Bob Sinclair, "Filtration Fundamentals: Is Knowledge of Filter Technology Something You Let Fall Through the Cracks?," The Scientist, p. 1-6, (Sep. 28, 1998).

(Continued)

*Primary Examiner* — Ana Fortuna
(74) *Attorney, Agent, or Firm* — Fulwider Patton LLP (57) ABSTRACT

The present invention is directed to a method and apparatus for desalinating seawater utilizing a two stage seawater desalination system, a first stage including at least one high performance nanofiltration membrane to receive seawater feed pressurized by a first stage pump sufficiently and to produce a first permeate, and a second stage including at least one high performance nanofiltration membrane to receive the first permeate pressurized by a second stage pump to between about 200 psi and about 300 psi to produce potable water.

11 Claims, 4 Drawing Sheets

U.S. PATENT DOCUMENTS

| | | | | |
|---|---|---|---|---|
| 6,132,618 | A * | 10/2000 | Bass et al. | 210/652 |
| 6,162,361 | A * | 12/2000 | Adiga | 210/652 |
| 6,171,497 | B1 | 1/2001 | Hirose et al. | |
| 6,177,011 | B1 | 1/2001 | Hachisuka et al. | |
| 6,187,200 | B1 * | 2/2001 | Yamamura et al. | 210/652 |
| 6,190,556 | B1 | 2/2001 | Uhlinger | |
| 6,508,936 | B1 * | 1/2003 | Hassan | 210/652 |
| 6,783,682 | B1 * | 8/2004 | Awerbuch | 210/652 |
| 6,946,081 | B2 * | 9/2005 | Voutchkov | 210/774 |
| 7,144,511 | B2 * | 12/2006 | Vuong | 210/652 |
| 2001/0017278 | A1 | 8/2001 | Verde | |

FOREIGN PATENT DOCUMENTS

| | | |
|---|---|---|
| JP | 2000-15257 | 1/2000 |
| JP | 2001-47045 | 2/2001 |

OTHER PUBLICATIONS

Lance Johnson, Stuart McClellan, and Craig Granlund, "Low-energy RO elements continue to improve," Water Technology, National Trade Publications, Inc. (Latham, NY), p. 70-73, (Aug. 6, 2000).

Keiran Lindsey, "DMD00 The 2000 Guide to the Membrane Industry," bcc, Business Communications Company, Inc. (Norwalk, Connecticut), p. 1-13, (Dec. 6, 2000).

Melissa Torok, "The Filtration Spectrum," Filtration News, Osmonics, p. 1-6, (May 1, 1994).

David. J. Paulson, "Membranes, the Finest Filtration: Introduction to Crossfolw Membrane Technology," Filtration News, Osmonics, Inc., p. 1-8, (Jul. 1, 1995).

Filmtec Elements, "Reverse Osmosis and Nanofiltration Elements for Consumer and Commercial Water Purification Systems," Dow Liquid Separations, The Dow Chemical Company (Midland, MI), p. 1-6, (Apr. 6, 1997).

Filmtec Elements, "An Overview of Products, Applications, and Technical Resources," Dow Liquid Separations, The Dow Chemical Company (Midland, MI), p. 1-10, (Dec. 6, 1997).

The Dow Chemical Company, "Filmtec Membranes," Product Information, The Dow Chemical Company (Midland, MI), p. 1-5, (Feb. 6, 2001).

The Dow Chemical Company, "Filmtec Membranes: Products and Specification Guide," Dow Liquid Separators, The Dow Chemical Company (Midland, MI), p. 1-2, (Jun. 6, 1999).

Kellie Rogge, "Lake Mead National Park Using Water Purification Technology From the Dow Chemical Company," Filmtec Membranes News, The Dow Chemical Company (Midland, MI) p. 1-3, (May 6, 2002).

Mark Johnson, "The Melt and Stretch of Cheese," Dairy Pipeline, University of Wisconsin (Wisconsin), vol. 12 (No. 1), p. 1-8, (Jan. 6, 2000).

Mavrov V et al.: "Reduction of water consumption and wastewater quantities in the food industry by water recycling using membrane processes" Desalination, Elsevier, Amsterdam, NL, vol. 131, No. 1-3, Dec. 20, 2000, pp. 75-86, XP004306340 ISSN: 011-9164.

European Search Report issued May 15, 2008, pp. 1-3.

* cited by examiner

TWO STAGE NANOFILTRATION SEAWATER DESALINATION SYSTEM

CROSS-REFERENCES TO RELATED APPLICATIONS

This application is a continuation application of U.S. patent application Ser. No. 10/137,072, filed May 2, 2002, now U.S. Pat. No. 7,144,511, and claims priority to same and is hereby incorporated by reference in its entirety.

BACKGROUND OF THE INVENTION

Rivers, lakes, streams, and springs have provided humans and other animals with welcome and plentiful sources of drinking water for many thousands of years. It is well known that as the human population has increased, so too has the demand for drinking water. The Romans, for example, built aqueducts to provide bath water. As the population increased, the water was diverted for drinking and cooking purposes. More recently drilling tools have been used to access drinking water stored underground in aquifers. Not unlike rivers, lakes, and streams, aquifers too have been subject to draw down and pollution often making them unfit as a source of drinking water without extensive and impractically expensive treatment.

More recently, the oceans of the world have garnered increased attention as vast reservoirs of potential drinking water. Due to the relatively high salinity of seawater, the phrase "Water water everywhere, but not a drop to drink" is a truism. Raw seawater contains so much salt, that it is not fit for human consumption.

In the open oceans of the world, seawater contains about 35,000 mg/l of total dissolved solids, also referred to as salinity, slightly less in the polar and coastal regions due to incursion of fresh water from melting ice and runoff from rivers and streams. Substantially reduced salinity from the outfall of the Columbia River in Washington State has been measured more than 200 miles from its mouth. On the other hand, the Persian Gulf and Red Sea are known, for example, to have salinity levels of about 40,000 mg/l due to high rates of evaporation and relatively little rainfall.

It is also generally accepted that to be of drinking quality water cannot possess more than 500 mg/l of total dissolved solids of which chloride content should not exceed 250 mg/l. To meet this standard, over 98.5% of the salt in seawater must be removed. Potable water is defined herein as water of drinkable quality containing no more than 500 mg/l of total dissolved solids of which chloride does not exceed 250 mg/l.

Over 70 elements are dissolved in seawater. However, only six ions make up over 99% by weight of all the dissolved solids in seawater. Sodium and chloride, each of which are in the form of monovalent ions, not only account for its salty taste, but also make up slightly more than 85% of all the dissolved solids in seawater. Sodium accounts for about 30% and chloride accounts for slightly more than 55% by weight of all dissolved solids in seawater. The other four ions include calcium, magnesium, potassium and sulfate. Calcium, magnesium, and sulfate are divalent ions. Potassium is a monovalent ion accounting for only about 1.1% by weight of seawater.

A process known as reverse osmosis has been applied to produce potable water from seawater. Reverse osmosis is a process that is reversed from the naturally occurring process of osmosis. Osmosis occurs when solutions of differing concentrations are separated by a semipermeable membrane. Hydraulic pressure is exerted across the membrane upon the solution of higher solute concentration by the solution of lower solute concentration. The osmotic pressure across the membrane is directly proportional to the difference in concentration between the two solutions. Pressure must be applied to the more concentrated solution to counteract the natural osmotic pressure being exerted upon it. To reverse the direction of the natural osmotic flow, additional pressure is required.

Reverse osmosis (RO) requires that high pressure be applied to the seawater due in part to the fineness of the membrane and due also to the additive force required to overcome the osmotic pressure preferring to work in the opposite direction to encourage the dilution of seawater rather than an increase in salt concentration. A reverse osmosis membrane is extremely fine and capable of rejecting extremely small contaminants such as bacteria, sugars, proteins, dyes, and salts. Under such high pressure, some potable water permeates through the semipermeable membrane, leaving the balance of the seawater and nearly all the salt retained without passing through the membrane forming a more salt-rich concentrate to be swept away under pressure. Thus, the seawater is fractionated by the membrane into a permeate of low salt concentration and a concentrate or retentate of salt concentration higher than seawater.

Feasibility of desalinating seawater has been known. However, the high material and operational costs to support seawater desalination facilities have stymied broad application of the process.

It is known in the art that about 360 psi must be applied to seawater at 35,000 mg/l salt just to neutralize the natural osmotic pressure exerted by potable water from the opposite side of the membrane. It is further disclosed in the art that total pressure of about 800-1,200 psi is required to produce, through an RO membrane, potable water from seawater.

Application of such high pressure requires expensive and high pressure tolerant materials including stainless steel to contain the pressurized saline solutions. Moreover, expensive pump machinery and high energy required to operate the machinery to produce the high pressure required drives up costs significantly. Moreover, application over time of such force to a reverse osmosis membrane tends to rapidly reduce its efficiency through compaction effects. These effects become increasingly severe above 600 psi reducing flow across the membrane over time and correspondingly reducing membrane life adding further to costs of operation including downtime and replacement of membranes.

Reduced pressures required for filtration through RO membranes have also been disclosed in the art. For example, U.S. Pat. No. 4,156,645 to Bray, the disclosure of which is herein incorporated by reference, discloses an RO desalination process that includes filtration in two stages, the first stage producing an intermediate product water containing from one fourth to one half the salt content of the seawater feed at a pressure of 300 to 550 psi through a relatively loose RO membrane, followed by a subsequent stage filtration of the intermediate product through a tighter RO membrane at the same or greater pressure than the first stage producing a final product water containing less than 2,000 ppm total dissolved solids. It is also disclosed in Bray that such lower pressures allow for use of lower cost plastic materials.

Reverse osmosis membranes are known generally in the art to be the tightest of all membranes. However, additional less restrictive filtration mechanisms are known in the art. Ultrafiltration is generally known to include filtration of particulates with molecular weights of 1,000 to 100,000 g/mol.

Operating loosely between and to some extent overlapping these two levels of restriction is nanofiltration (NF). As disclosed in U.S. Pat. No. 5,587,083 to Twardowski, the disclosure of which is herein incorporated by reference, like RO membranes, NF membranes are composite structures composed of cross-linked aromatic polyamides comprising a microporous polymer sheet supporting a skin layer. Such a membrane structure is generally known as a thin film composite (TFC). Unlike RO membranes, however, NF membranes have a larger pore size in the skin layer and a net negative electrical charge inside the individual pores. The pores work to exclude material by size and the electrical charge works to exclude electrically charged species according to the surface charge density of introduced ions. The '083 patent discloses employment of nanofiltration to selectively separate polyvalent ionic species such as sodium sulfate from aqueous solutions also containing, for example, monovalent species such as sodium chloride, the sodium chloride passing through the nanofiltration membrane. The '083 patent also discloses that reverse osmosis rejects all ionic species.

Separation of salts on an electrical charge basis utilizing nanofiltration membranes is also disclosed in U.S. Pat. No. 5,458,781 to Lin, the disclosure of which is herein incorporated by reference. The '781 patent proposes a process to separate the monovalent anion bromide from sea and brackish waters utilizing a combination of RO and NF membranes. It is disclosed that the NF membrane selectively allows bromide ions to pass while rejecting polyvalent anions. It is proposed that the charge separation properties of the nanofiltration membrane disclosed therein may provide for separation of a feed stream into a monovalent anion rich permeate stream leaving behind polyvalent anion rich retentate.

Similarly, U.S. Pat. No. 6,190,556 to Uhlinger, the disclosure of which is herein incorporated by reference, proposes use of RO and NF membranes in combination with each other to produce potable water from seawater. It is disclosed therein that a vessel containing both membranes receives seawater pressurized to 250-350 psi for filtering in series first through at least one NF membrane the permeate stream from which is interrupted and pressurized via the same pump to 250-350 psi and pumped through at least one RO membrane, producing a permeate of potable water and a concentrate that is used to flush the NF membrane. It is proposed therein that the NF membrane produces a permeate stream of substantially reduced divalent ions, about 95% reduction, and moderately reduced monovalent ions, about 50% reduction. It is proposed therein that the salinity of the first permeate stream should be about 10,000 to 15,000 mg/l due in no small part to the presence to a great degree of monovalent sodium and chloride in seawater. The RO membrane of the second stage is able to operate under lower pressures due to the reduced salt content of its feed stream. Had the RO membrane been used in the initial stage to receive seawater feed at 35,000 mg/l salt, the existence of the extra salt would require substantially more operating pressure to obtain a permeate.

There still remains, however, a need for a simple, cost efficient and practical means for continuous production of potable water from seawater without use of reverse osmosis membranes.

SUMMARY OF THE INVENTION

This invention is directed to a two stage seawater desalination system that includes first and second stage high performance nanofiltration membranes in series flow relationship, the first stage membrane being pumped with seawater pressurized sufficiently to produce a first permeate and a first retentate, and a second stage membrane being pumped with the first permeate pressurized at between about 200 psi and about 300 psi to produce potable water and a second retentate. Optionally, water of 1,000 mg/l total dissolved solids may be produced. As a further option, the second retentate may have its pressure boosted by a boost pump to about the pressure of the pressurized seawater feed for introduction therein and recycling through the desalination system. The second retentate may also have its pressure reduced for introduction into the seawater feed. Also optionally, the first retentate may be depressurized by way of an energy recovery device. In cooperation with or independently from the second stage, the first retentate may be passed through a concentrate high performance nanofiltration membrane fractionating the first retentate into a high concentrate and a dilute concentrate, the dilute concentrate being produced optionally for addition and to dilute the seawater feed.

These and other features and advantages of the present invention will become apparent from the following detailed description which taken in conjunction with the accompanying drawings, further describes and illustrates by way of example the principles of the invention.

DETAILED DESCRIPTION OF THE PREFERRED EMBODIMENTS

The present invention is directed to a method and apparatus for desalinating seawater utilizing a two stage seawater desalination system, a first stage including at least one high performance nanofiltration membrane to receive seawater feed pressurized by a first stage pump sufficiently to produce a first permeate of lower salinity than the seawater feed and a first retentate of higher salinity than the seawater feed, and a second stage including at least one high performance nanofiltration membrane to receive the first permeate pressurized by a second stage pump to between about 200 psi and about 300 psi to produce potable water.

Pressurization of the seawater feed and the first permeate is accomplished by one or more pumps. The first permeate and the potable water exit their respective membranes at approximately atmospheric pressure. Each of the retentates flow out of their respective membranes at pressures approximating the pressures of their respective feed streams. The first retentate may be discarded, returned to the ocean, or, for added energy savings, may be depressurized through an energy recovery device such as a Pelton wheel, a reverse pump, hydraulic energy transfer, or the like. The meaning of the term depressurize being understood herein to also include less than full reduction in pressure to atmospheric. The second retentate may be discarded, returned to the ocean, depressurized through an energy recovery device, fed into the seawater feed tank, or may optionally, be pressurized by a booster pump and forwarded into the pressurized seawater feed for recycling through the desalination system.

Figure 1:
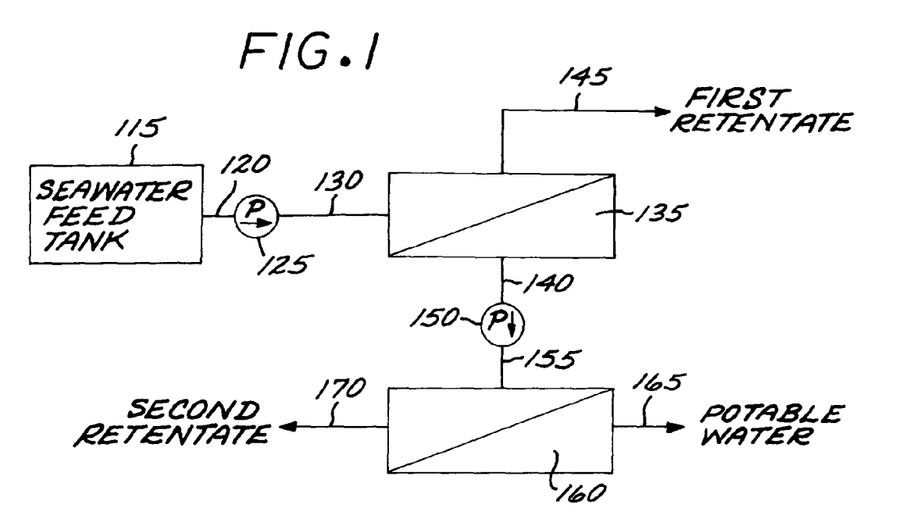
FIG. 1 is a flow diagram showing a method and apparatus to desalinate seawater utilizing first and second stage high performance nanofiltration membranes.

Referring to FIG. 1, raw seawater may be obtained by withdrawal directly from the ocean or a sea well, Ranier well, treated by sand or microfiltration or imported to the desalination facility from the ocean via truck or other transport means (not shown). Once at the facility the seawater may be stored in a seawater feed tank 115 at atmospheric pressure for use in the desalination process. The salinity of the seawater may be determined by conductivity testing, real time monitoring, or other methods known in the art. The seawater is drawn from the seawater feed tank by a first stage pump 125 connected thereto by a first pump inlet conduit 120. Seawater feed flows through the first stage pump which pressurizes and pumps the seawater feed for receipt by a first stage high performance nanofiltration membrane (FSM) 135 via a first stage pump outlet conduit 130 connected therebetween. The first stage pump 125 is selected to be capable of providing up to 600 psi or otherwise to sufficiently pressurize and force the seawater feed through the FSM to produce a first permeate. Optionally, this first permeate may of less than 25% of the salinity of the seawater feed. Sufficient pressure of the seawater feed to produce the first permeate is between about 400 psi and about 600 psi, preferably between about 500 psi and about 550 psi. The first permeate exits the first stage membrane at approximately atmospheric pressure and thus requires additional pressurization to produce potable water forced through the second stage nanofiltration membrane.

Connected to the FSM 135 for receipt of the first permeate is a first permeate exit conduit 140. The first permeate exits the FSM at approximately atmospheric pressure via the first permeate exit conduit. Most, if not all, of the salt not passed through the FSM as first permeate, is retained in a first rententate which exits the FSM through a first retentate exit conduit 145 connected to the FSM for receipt of the first retentate. The seawater feed is thus fractionated by the FSM into a first permeate of lower salinity than the seawater feed and into a first retentate the salinity of which is greater than the seawater feed.

The first permeate exits the FSM 135 through the first permeate exit conduit 140 and is drawn into a second stage pump 150 and pressurized therein to between about 200 psi and about 300 psi and pumped to a second stage high performance nanofiltration membrane (SSM) 160 in series flow relationship to the FSM through a second pump outlet conduit 155 connected therebetween. Connected to the SSM for receipt of the potable water is a potable water exit conduit 165. The potable water exits the SSM at approximately atmospheric pressure via the potable water exit conduit. Most, if not all, of the salt not passed through the SSM as potable water, is retained in a second rententate which exits the SSM through a second retentate exit conduit 170 connected to the SSM for receipt of the second retentate. The first permeate is thus fractionated by the SSM into potable water and a second retentate the salinity of the second retentate being greater than the salinity of the first permeate.

The pressure of the seawater feed sufficient to produce the first permeate must exceed the osmotic pressure across the FSM 135. For example, in the case of seawater feed with a salinity of 35,000 mg/l, and a first permeate of 25% salinity of the seawater feed, the osmotic pressure across the FSM is at about 270 psi. Pressure sufficient to create a first permeate from such a seawater feed must therefore exceed 270 psi. To produce a substantial flux of first permeate, substantially more than osmotic pressure needs to be applied to the seawater feed. To produce a substantial flux of first permeate, the seawater feed is preferably pressurized by the first stage pump 125 to between about 500 psi and about 550 psi. Substantially exceeding 600 psi, however, is not only unnecessary, application of such pressures drives up energy and material costs.

Producing potable water from the first permeate of the present invention requires substantially less applied pressure than to produce the first permeate. Producing water of slightly lower quality, for example, 1000 mg/l salt, requires slightly less applied pressure either to the seawater feed or to the first permeate as desired.

Utilizing the same seawater example of 35,000 mg/l salt, the first permeate must contain about 8,750 mg/l salt to be of 25% salinity of the seawater feed. Inputting such a first permeate to the SSM and producing potable water, the osmotic pressure differential across the SSM 160 is therefore about 90 psi. Utilizing the present invention, the salinity of the first permeate is typically less than 25% of the seawater feed. To obtain a substantial flux of potable water from such a first permeate requires that the first permeate be pressurized by the second stage pump 150 to between about 200 psi and about 300 psi before entering the SSM.

The nanofiltration membranes of the present invention are thin film composite structures that include an ultra-thin polyamide barrier layer, a microporous polysulfone layer interlayer, and a polyester support web. Typically each membrane is produced in sheet form, is folded numerous times, and spirally wound into a cylindrical cartridge. Each cartridge typically includes an input feed port and two output ports for the separate exits of permeate and retentate. Although size may vary, such cartridges are often made available by suppliers in the art in diameters of approximately 4 and 8 inches and lengths typically of 40 inches.

Nanofiltration membranes have been known to preferably reject polyvalent ions in favor of monovalent species. However, membranes that allow passage of all monovalent ions do relatively little to reduce salinity in seawater. For example, rejection of only polyvalent ions, calcium, magnesium, and sulfate will result in the monovalent ions, sodium, chloride, and potassium passing through to the permeate. Assuming that only polyvalent ions were retained, the salinity of the permeate would be no less than 86% of the salinity of the seawater feed. Should water be retained with the polyvalent ions, the salinity of the permeate will be greater and conceivably even greater than the seawater feed.

Some nanofiltration membranes, however, do not provide for complete rejection based on the nature or extent of the electrical charge on the introduced ions, but rather provide relative rejection rates, preferring rejection to some extent of polyvalent ions over monovalent ions. As heretofore stated, the '556 patent to Uhlinger proposes an NF membrane that rejects at least about 95% of the divalent ions and at least about 50% of the monovalent ions present in seawater containing 35,000 mg/l salt. It is further disclosed therein that the NF permeate therefrom is, after flow interruption, thereafter forced through an RO membrane that rejects at least 98% of the remaining salt to form an RO permeate of potable water.

Also, the NF permeate yield is proposed therein to be at least 40-45% of the seawater feed and the RO permeate yield is proposed to be, under typical operating conditions, approximately 80-85% of the NF permeate. Such rejection was proposed therein as occurring with applied pressure of 250 psi to 350 psi to each of the two stages, the overall recovery of potable water from seawater to be about 26-30% by volume.

Certain nanofiltration membranes, defined herein as high performance nanofiltration (HPNF) membranes, are capable of rejecting contaminants based on molecular weight and on an electrical charge basis. For example, each of the HPNF membranes utilized in the present invention reject contaminants of between about 140 to 300 Daltons or greater and over 99% divalent ions and up to about 90% of monovalent ions from a seawater feed. The high performance membranes utilized in the present invention are available, for example, by Dow Filmtec, Model No. NF90-4040. The 8-inch diameter membrane employs a membrane area of roughly 400 square feet spirally wound into a cartridge, while the 4-inch membrane employs a membrane area of roughly 82 square feet similarly wound.

In the present invention, at least two such HPNF membranes are employed in series flow relationship as the FSM and the SSM. Utilizing such membranes, rejection of monovalent ions from seawater has been determined to be greater than 75%. Divalent ions, albeit appearing in much lower concentrations in seawater, have been rejected to a relatively greater degree, on the order of at least 95%. Although various HPNF membranes may be employed, the present invention also contemplates preferred use of a single model HPNF membrane as such use presents convenient inventory advantages requiring a lower variety of cartridges, associated fittings and parts. Although only one high performance membrane may be utilized per stage, it is preferable that multiple HPNF membranes be connected together in series to form a each stage. This practice of linking membranes to form a stage is commonly practiced to achieve desired yield and quality of permeate and retentate produced. In many RO systems, six to eight membranes, for example, are linked in series to form a single stage. In the present invention, it has been advantageously found that only five high performance nanofiltration membranes connected together in series to form each stage is preferred. The following table contains test data of rejection rates utilizing the present invention at the stated applied pressures of 525 psi to the seawater feed containing about 35,000 mg/l salt entering the FSM and 300 psi to the first permeate entering the SSM. The FSM and the SSM each employed five 4-inch diameter high performance nanofiltration membranes.

TABLE 1

| Ion | Seawater Feed ~35,000 mg/l | 525 psi, $1^{st}$ Perm. mg/l | 300 psi, $2^{nd}$ Perm. mg/l | Rejection Ratios $1^{st}/2^{nd}$ |
|---|---|---|---|---|
| Chloride | 20,588 | 2,473 | 113 | 88.0/95.4 |
| Sodium | 11,322 | 1,552 | 74 | 86.3/95.2 |
| Sulfate | 2,710 | 8.4 | trace | 99.7/~100 |
| Calcium | 455 | 9.8 | 0.4 | 97.8/95.9 |

It is apparent from the data that rejection of divalent ions, sulfate and calcium, is preferred over monovalent ions, sodium and chloride. Flux through the FSM was about 7 gallons/square foot of membrane/day. To provide a practical amount of product, flux through the FSM may vary from about 6-10 gallons/square foot of membrane/day. Flux through the SSM was found to be about 20 gallons/square foot/day, but may vary from about 19-26 gallons/square foot of membrane/day. The disparity in flux through the membranes is accounted for in part by the greatly reduced osmotic pressure of the second stage and in part by the disparity in volume yield.

The data in Table 1 shows that the salt concentration of the first permeate is less than 25% of the seawater feed. At about 35,000 mg/l salt, the osmotic pressure of the seawater feed vs. first permeate at only about 12% of the salt concentration of the seawater feed, for example, is about 315 psi. However, the osmotic pressure of the first permeate at, for example, about 4,750 mg/l salt vs. potable water is only about 45 psi. The lower osmotic pressure across the SSM advantageously requires less applied pressure to force the potable water through the second stage.

The flux through the SSM was accomplished by temporarily storing a sufficient amount of first permeate from the FSM to provide an adequate amount of first permeate to the SSM. Volume yield of the first permeate was measured at about 35% of the seawater feed volume. The volume yield of potable water from the first permeate was measured at about 79%. The total yield of potable water was therefore about 28% by volume of the seawater feed to the FSM.

It is to be understood that pressures, yields, and flux may vary depending upon the degree of particular membrane restriction, including but not limited to restriction due to build up of scale and debris. Additionally, it is to be understood that multiple HPNF membranes may also be configured together in parallel and/or serial formation depending upon the amount and salinity of product water desired. For example, the disclosure thus far provides for first stage and second stage high performance nanofiltration membranes connected to each other in series flow relationship. The present invention, however, is not so limited. A greater number of HPNF membranes may be utilized together in series should operation at lower pressures or higher purity water be desired. Additionally, or alternatively, such membranes may be arranged in parallel configuration to provide increased production capacity. For example, for uninterruptible operation of the SSM, the second stage pump pressure may be lowered to accommodate the flux of the first permeate. Alternatively, a plurality of FSMs may be utilized, for example, in parallel formation to provide sufficient flux of first permeate to the SSM for continuous production of potable water. Optionally, water of lesser quality, such as 1,000 mg/l total dissolved solids, may be produced by the present invention.

Referring again to FIG. 1, the first stage pump 125 must be capable of providing sufficiently pressurized seawater feed to produce through the FSM 135 a first permeate. A pump capable of operating at about 400 psi to about 600 psi is suitable. The second stage pump 150 must be capable of providing sufficiently pressurized first permeate to produce through the SSM 160 potable water. A pump that can pressurize the first permeate to 300 psi should be sufficient. The first and second stage pumps may each be a single pump or may, if desired, be a plurality of pumps configured, as is known in the art, to provide adequate pressure and flow.

In addition to dissolved solids, raw seawater often includes particulate matter that is preferably filtered out through use of a particulate filter such as a standard cartridge filter as, for example, provided by Ametek, Model F-201, standard blue with pleated filter. The particulate filter (not shown in FIG. 1) may be interposed between the first stage pump and the seawater feed tank via a conduit connected therebetween.

Also optionally, an anti-scalant feed system may be utilized to inject anti-scalant solution into the seawater feed to inhibit restrictive and potentially clogging scale build up. The anti-scalant feed system (not shown in FIG. 1) may be connected to the first pump inlet conduit via an injection port mounted thereon.

Figure 2:
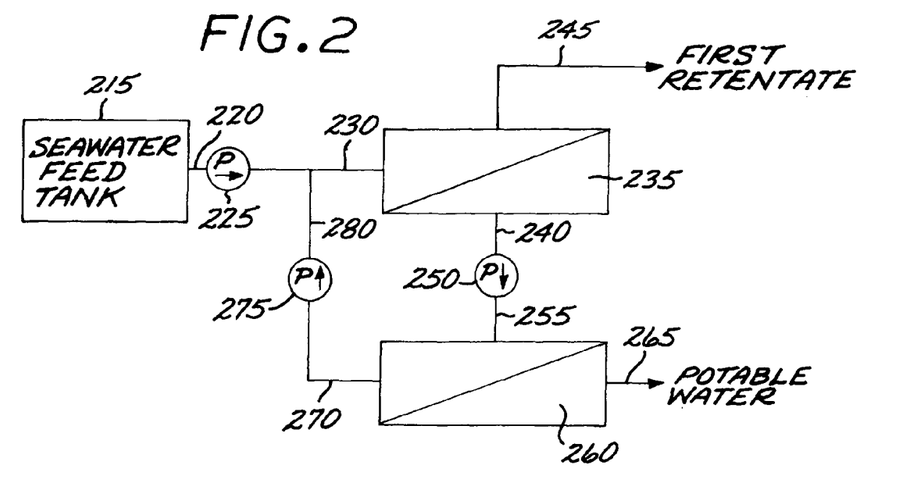
FIG. 2 is a flow diagram showing a method and apparatus to desalinate seawater including first and second stage high performance nanofiltration membranes and an energy saving recycling system.

Referring to FIG. 2, is shown a seawater feed tank 215 for storing seawater. The seawater may be drawn from the seawater feed tank by a first stage pump 225 connected thereto by a first pump inlet conduit 220. Seawater feed flows through the first stage pump which pressurizes and pumps the seawater feed for receipt by a first stage high performance nanofiltration membrane (FSM) 235 via a first pump outlet conduit 230 connected therebetween. The first stage pump is selected to sufficiently pressurize and force the seawater feed through the FSM to produce a first permeate.

Connected to the FSM 235 for receipt of the first permeate is a first permeate exit conduit 240. The first permeate exits the FSM at approximately atmospheric pressure via the first permeate exit conduit. Most, if not all, of the salt not passed through the FSM as first permeate, is retained in a first rententate which exits the FSM through a first retentate exit conduit 245 connected to the FSM for receipt of the first retentate. The seawater feed is thus fractionated by the FSM into a first permeate having a salt concentration lower than the seawater feed and into a first retentate the salinity of which is greater than the seawater feed.

The first permeate exits the FSM 235 through the first permeate exit conduit 240 and is drawn into a second stage pump 250 and pressurized therein to between about 200 psi and about 300 psi and pumped to a second stage high performance nanofiltration membrane (SSM) 260 in series flow relationship to the FSM through a second pump outlet conduit 255 connected therebetween. Connected to the SSM for receipt of the potable water is a potable water exit conduit 265. The potable water exits the SSM at approximately atmospheric pressure via the potable water exit conduit. Most, if not all, of the salt not passed through the SSM as potable water, is retained in a second rententate which exits the SSM through a second retentate exit conduit 270 connected to the SSM for receipt of the second retentate. The first permeate is thus fractionated by the SSM into potable water and a second retentate, the salinity of the second retentate being greater than the salinity of the first permeate.

In this embodiment of the present invention, the second retentate is introduced into the seawater feed for recycling through the FSM 235 and the SSM 260 of the desalination system. The second retentate remains pressurized at between about 200 psi to about 300 psi and travels through the second retentate exit conduit 270 into a booster pump 275 connected thereto. The booster pump is selected to sufficiently pressurize and pump the second retentate to join the seawater feed in the first stage pump outlet conduit 230 through a booster pump outlet conduit 280 connected therebetween. Although it may vary from between about 15% and about 35%, the preferred volume of the second retentate is between 20% and 30% of the volume of the first permeate and is preferably about 7% to about 15% by volume of the seawater feed to the FSMs.

The salt concentration of the second retentate most often is below that of the seawater feed. Should it be desired, the concentration of the second retentate may be monitored by conductivity testing or the like. Introduction of the second retentate into the pressurized seawater feed may be controlled by valving means, boost pump deactivation, or other control means known in the art.

Recycling of the second retentate provides advantageous energy savings since it only requires a pressure boost of about 200 psi to 350 psi, depending on its pressure exiting the SSM, to equal the preferred pressure of the pressurized seawater feed of between about 500 psi to about 550 psi. Entry of fully pressurized second retentate into the pressurized seawater feed may displace the same volume of seawater feed that would otherwise require the energy necessary to pressurize it sufficiently from atmospheric. Additionally, should the second retentate be of lower salt concentration than the seawater feed, use of the second retentate for recycling will have a diluting effect thus likely prolonging use and extending maintenance periods of the membranes. The dilution effect also lowers the salt concentration of the pressurized seawater feed thereby providing for the lowering, if desired, of operating pressures and further energy savings.

Figure 3:
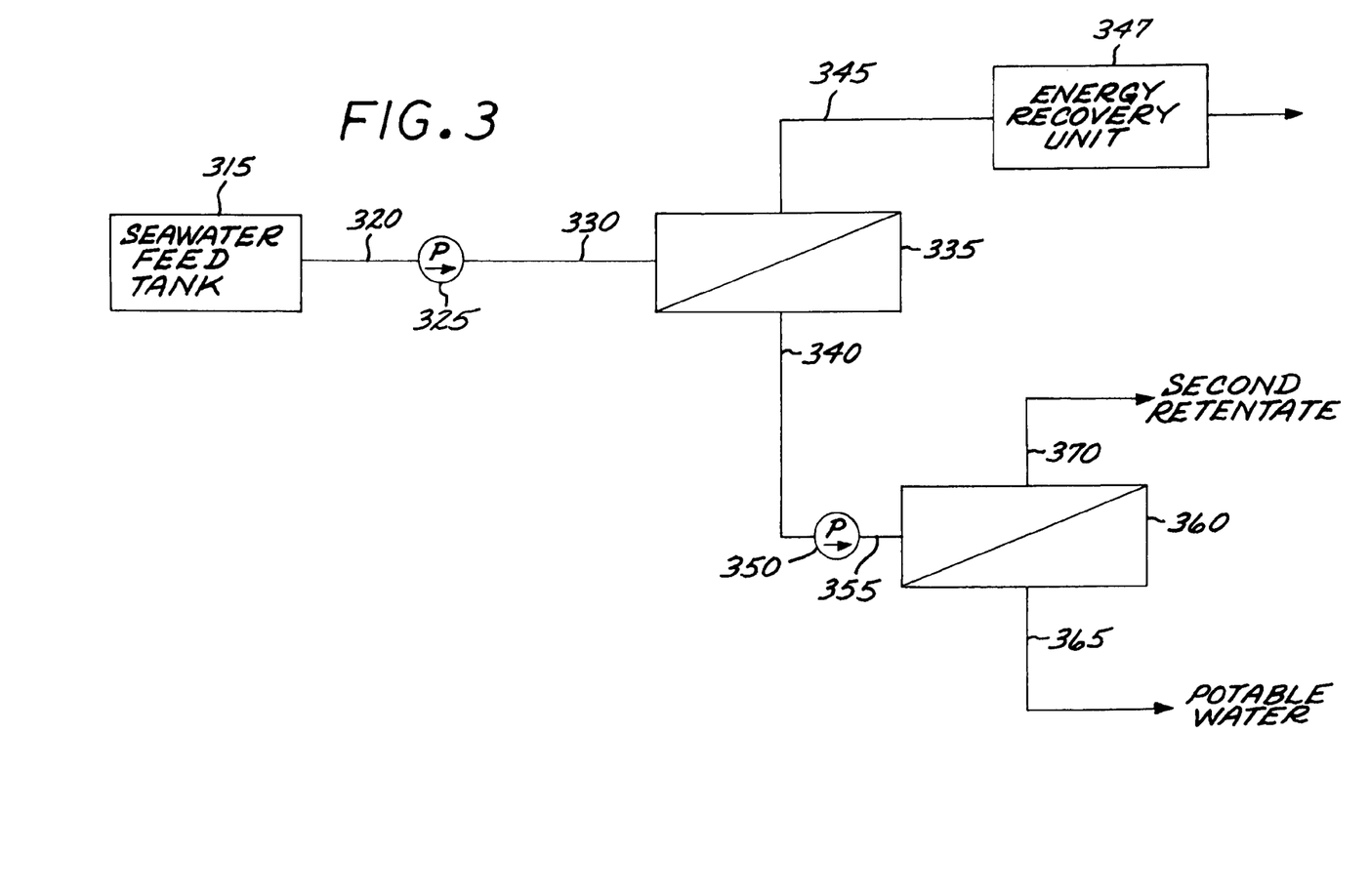
FIG. 3 is a flow diagram showing a method and apparatus to desalinate seawater including first and second stage high performance nanofiltration membranes and an energy recovery device.

Referring to FIG. 3, is shown a seawater feed tank 315 for storing seawater. The seawater may be drawn from the seawater feed tank by a first stage pump 325 connected thereto by a first pump inlet conduit 320. Seawater feed flows through the first stage pump which pressurizes and pumps the seawater feed for receipt by a first stage high performance nanofiltration membrane (FSM) 335 via a first pump outlet conduit 330 connected therebetween. The first stage pump is selected to sufficiently pressurize and force the seawater feed through the FSM to produce a first permeate of lower salinity than the seawater feed.

Connected to the FSM 335 for receipt of the first permeate is a first permeate exit conduit 340. The first permeate exits the FSM at approximately atmospheric pressure via the first permeate exit conduit. Most, if not all, of the salt not passed through the FSM as first permeate, is retained in a first rententate which exits the FSM through a first retentate exit conduit 345 connected to the FSM for receipt of the first retentate. The seawater feed is thus fractionated by the FSM into a first permeate having a salt concentration of lower than the seawater feed and into a first retentate the salinity of which is greater than the seawater feed.

In this embodiment of the present invention, the first retentate remains pressurized from the pressurized seawater feed and enters an energy recovery device 347 via the first retentate exit conduit 345 connected thereto. The recovery device depressurizes the first retentate and recovers energy therefrom as is known in the art, as for example, hydroelectric conversion.

The first permeate exits the FSM 335 through the first permeate exit conduit 340 and is drawn into a second stage pump 350 and pressurized therein to between about 200 psi and about 300 psi and pumped to a second stage high performance nanofiltration membrane (SSM) 360 in series flow relationship to the FSM through a second pump outlet conduit 355 connected therebetween. Connected to the SSM 360 for receipt of the potable water is a potable water exit conduit 365. The potable water exits the SSM at approximately atmospheric pressure via the potable water exit conduit. Most, if not all, of the salt not passed through the SSM as potable water, is retained in a second rententate which exits the SSM through a second retentate exit conduit 370 connected to the SSM for receipt of the second retentate. The first permeate is thus fractionated by the SSM into potable water and a second retentate, the salinity of the second retentate being greater than the salinity of the first permeate.

Figure 4:
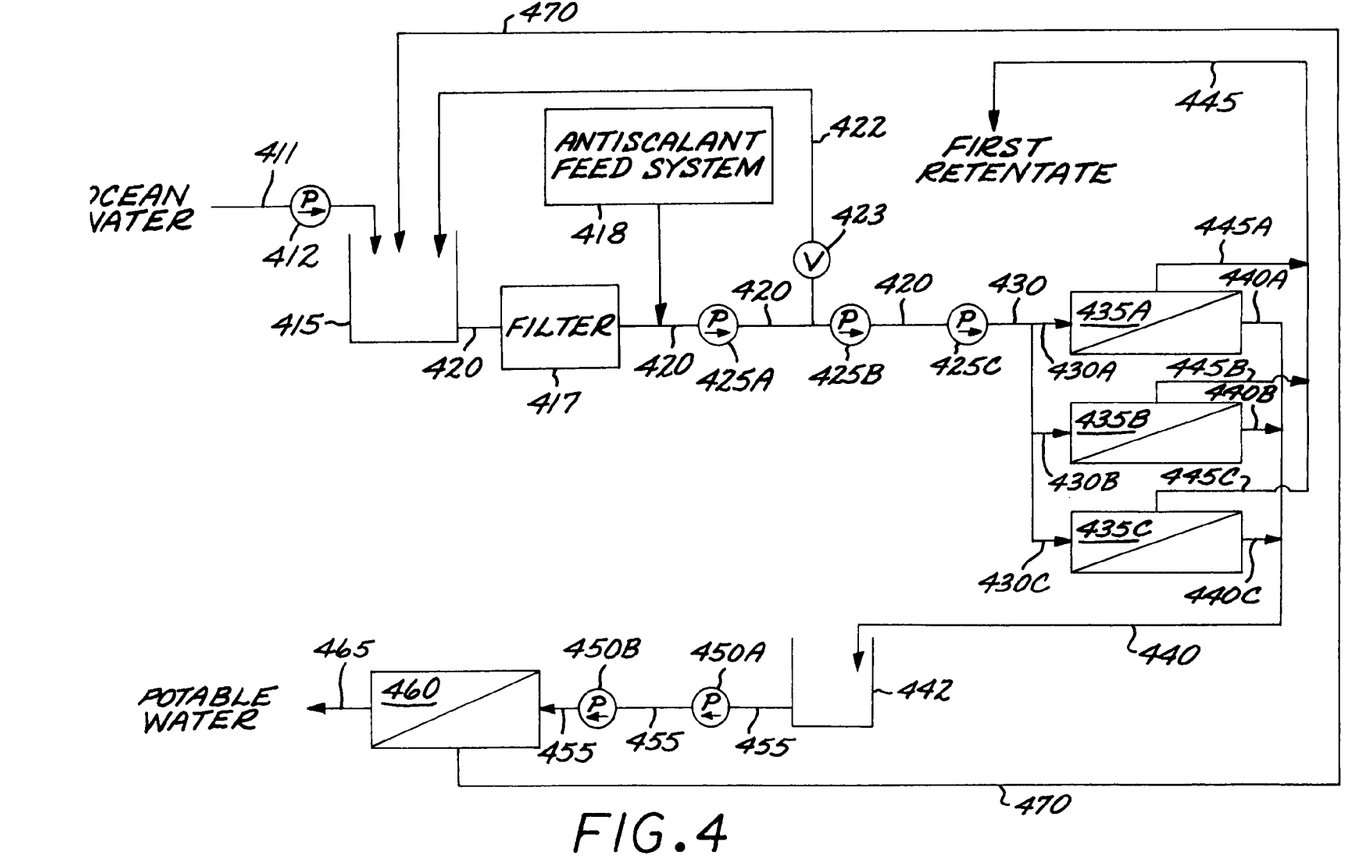
FIG. 4 is a flow diagram showing a method and apparatus to continuously desalinate seawater utilizing three parallel first stage high performance nanofiltration membranes in combination with a single second stage high performance nanofiltration membrane.

Referring to FIG. 4, raw seawater is drawn through an intake conduit 411 by a seawater intake pump 412 and fed to a seawater feed tank 415 for storage at atmospheric pressure and use in the desalination process. The raw seawater feed is drawn from the seawater feed tank through a plurality of first stage pumps, in this embodiment, three first stage pumps connected in consecutive series flow relationship to each other beginning with an initial first stage pump 425A, followed by a secondary first stage pump 425B, and lastly a tertiary first stage pump 425C interconnected therebetween by a first stage pump inlet conduit 420. The seawater feed flows through the three first stage pumps which pressurize and pump the seawater feed for receipt by a plurality of first stage high performance nanofiltration membranes (FSM(s)) in parallel flow relationship to each other, in this embodiment, a first FSM 435A, a second FSM 435B, and a third FSM 435C. Connected to the tertiary first stage pump via a first stage pump outlet conduit 430 is a manifold with three manifold outlets 430A, 430B, and 430C connected respectively to the first FSM, the second FSM, and the third FSM. Optionally, flow to each of the FSMs may be controlled by insertion of a manifold outlet valve (not shown) in each of the manifold outlet conduits as desired. In the present embodiment, three FSM's are selected to receive the pressurized seawater feed to produce a total volume sufficient for continuous supply of first permeate to the second stage nanofiltration membrane.

The three first stage pumps 425A-C are selected in combination to sufficiently pressurize and force in serial flow relationship the seawater feed through the FSMs to produce a first permeate of lower salinity than the seawater feed. The three first stage pumps are arranged in series flow relationship to provide for sequential increase in pressure to the seawater feed and to provide in combination sufficient pressure and flow desired to the FSMs. Additionally, a plurality of first stage pumps provides flexibility for operation of less than all pumps, should a lower flow or pressure be desired. For example, particulate filtration of the seawater feed and addition of anti-scaling solution to the seawater feed may be carried out through operation of a single first stage pump, thus providing for energy savings. In the present embodiment, for example, a particulate filter 417 is interposed between the initial first stage pump 425A and the seawater feed tank 415 via the first stage pump inlet conduit 420 connected therebetween.

Also shown in FIG. 4 is an anti-scalant feed system 418 connected to the first stage pump inlet conduit 420 between the initial first stage pump 425A and the particulate filter 417. The anti-scalant feed system provides anti-scalant solution as desired into the seawater feed to inhibit restrictive and potentially clogging scale build up.

Shown connected to the first stage inlet pump conduit 420 between the initial and secondary first stage pumps 425A and 425B is a recirculation conduit 422, the flow through which is controlled by a recirculation valve 423 and terminates into the seawater feed tank 415. The recirculation conduit and valve and initial first stage pump 425A may be operated as desired during operation or non-operation of the other pumps in the desalination system. Additionally, the recirculation conduit and the recirculation valve may be used for bleed off of seawater feed in the event adjustment of the flow or pressure of the seawater feed to the membranes is desired.

Connected respectively to each FSM 435A-C for receipt of the first permeate are three first permeate exit conduits emanating from their FSMs 435A, 435B, and 435C: first, second, and third first permeate exit conduits 440A, 440B, and 440C respectively. The three first permeate exit conduits join to form a consolidated first permeate exit conduit 440 which terminates at its downstream end into a first permeate holding tank 442. First permeate is produced by each FSM, or from as many as desired, and exits the FSMs into the respective first permeate exit conduits at approximately atmospheric pressure to merge into the consolidated first permeate exit conduit. For each FSM, most, if not all, of the salt not passed through the FSM as first permeate, is retained in a first rententate which exits the FSM through first retentate exit conduits 445A, 445B, and 445C connected respectively thereto and merge into a consolidated first retentate conduit 445 connected thereto. The seawater feed is thus fractionated by the FSMs into a first permeate having a salt concentration of less than the seawater feed and into a first retentate the salinity of which is greater than the seawater feed.

The first permeate is drawn from the first permeate holding tank 442 and pressurized to between about 200 psi and about 300 psi and pumped to a second stage high performance nanofiltration membrane (SSM) 460 in series flow relationship to the FSMs by an initial second stage pump 450A and a secondary second stage pump 450B. The two second stage pumps are connected in series flow relationship to each other and are interposed between the holding tank and the SSM by a second stage pump inlet conduit 455 therebetween. The holding tank stores the first permeate for use when desired for pumping through the SSM. Should sufficient first permeate be produced, the SSM may be operated to produce potable water continuously until cartridge replacement or maintenance is required. Optionally, the holding tank may be eliminated or bypassed by provision of direct conduit connection between the consolidated first permeate exit conduit 440 and the initial second stage pump 450A.

Connected to the SSM 460 for receipt of potable water is a potable water exit conduit 365. The potable water is forced through the SSM at approximately atmospheric pressure via the potable water exit conduit. Most, if not all, of the salt not passed through the SSM as potable water, is retained in a second rententate which exits the SSM through a second retentate exit conduit 470 connected to the SSM for receipt of the second retentate. The first permeate is thus fractionated by the SSM into potable water and a second retentate, the salinity of the second retentate being greater than the salinity of the first permeate.

In this embodiment of the present invention, the second retentate exits the SSM 460 in a pressurized state and is forwarded to the seawater feed tank 415 for recycling through the desalination system. It is conceivable that the salt concentration of the second retentate may be greater than the seawater feed. If desired, an additional pass of the second retentate through any of the membranes or dilution with salt water of lesser concentration may be performed prior to introduction to the seawater feed tank. Alternatively, the retentate may be discarded or transferred to the ocean.

Figure 5:
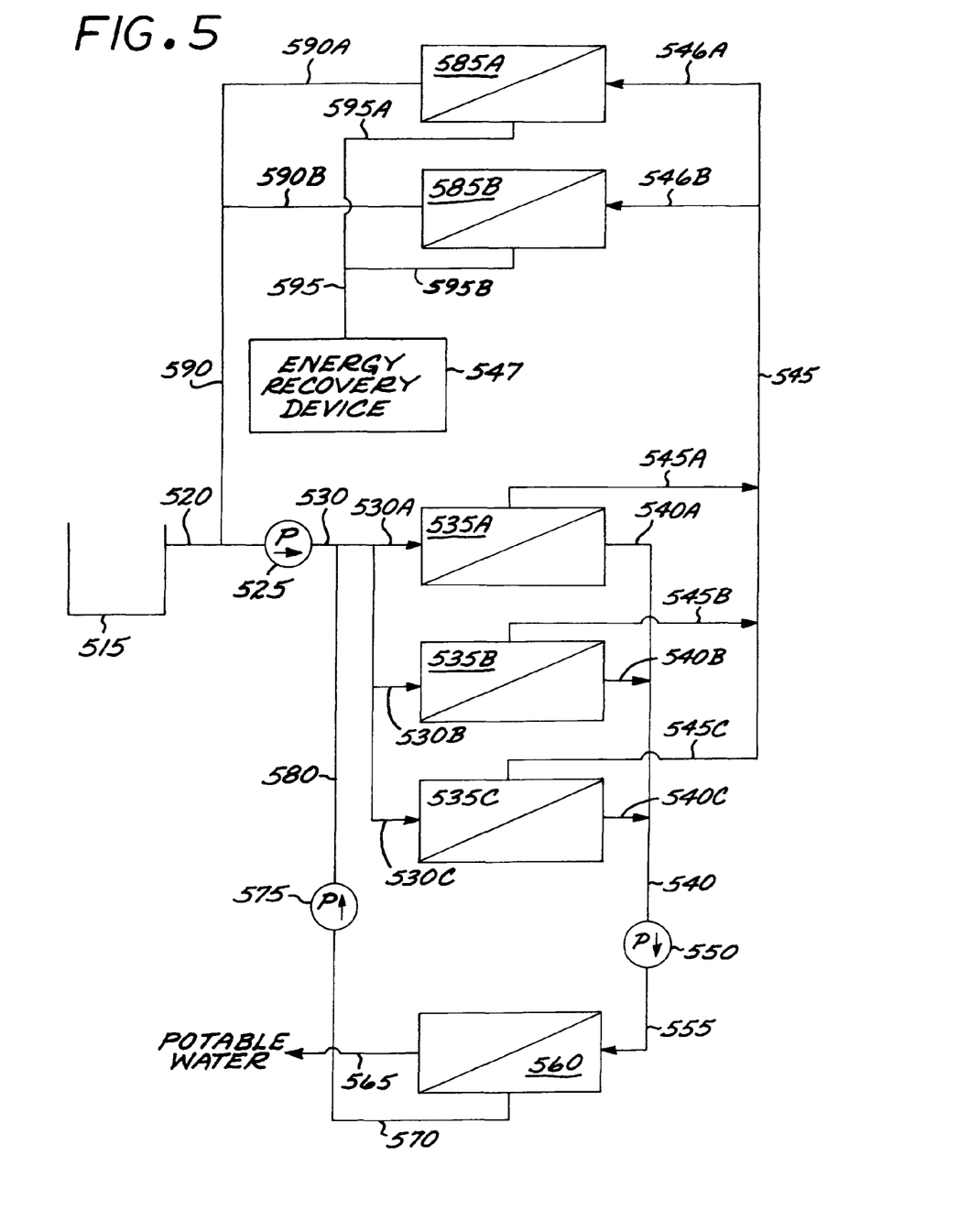
FIG. 5 is a flow diagram showing a method and apparatus to continuously desalinate seawater utilizing three parallel first stage high performance nanofiltration membranes in combination with a single second stage high performance nanofiltration membrane and a concentrate high performance nanofiltration membrane.

Referring to FIG. 5, is shown a seawater feed tank 515 for storing seawater. The seawater may be drawn from the seawater feed tank by a first stage pump 525 connected thereto by a first pump inlet conduit 520. Seawater feed flows through the first stage pump which pressurizes and pumps the seawater feed for receipt by three first stage high performance nanofiltration membranes, namely, a first FSM 535A, a second FSM 535B, and a third FSM 535C in parallel flow relationship to each other via a first pump outlet conduit 530 formed with manifold outlets 530A, 530B, and 530C respectively to feed the FSMs. The first stage pump is selected to sufficiently pressurize and force the seawater feed through the FSM to produce a first permeate of lower salinity than the seawater feed.

Connected respectively to each FSM 535A-C for receipt of the first permeate are three first permeate exit conduits emanating from their FSMs 535A, 535B, and 535C: first, second, and third first permeate exit conduits 540A, 540B, and 540C respectively. The three first permeate exit conduits join to form a consolidated first permeate exit conduit 540 which terminates into a second stage pump 550. First permeate is produced by each FSM, or from as many as desired, and exits the FSMs into the respective first permeate exit conduits at approximately atmospheric pressure to merge into the consolidated first permeate exit conduit. For each FSM, most, if not all, of the salt not passed through the FSM as first permeate, is retained in a first rententate which exits the FSM through first retentate exit conduits 545A, 545B, and 545C connected respectively thereto and merge into a consolidated first retentate conduit 545 connected thereto. The seawater feed is thus fractionated by the FSMs into a first permeate having a salinity of lower than the seawater feed and into a first retentate the salinity of which is greater than the seawater feed.

First permeate exits each FSM 535A-C through the first permeate exit conduits 540A-C and is drawn into the second stage pump 550 and pressurized therein to between about 200 psi and about 300 psi and pumped to a second stage high performance nanofiltration membrane (SSM) 560 in series flow relationship to the FSMs through a second pump outlet conduit 555 connected therebetween. Connected to the SSM for receipt of the potable water is a potable water exit conduit 565. The potable water exits the SSM at approximately atmospheric pressure via the potable water exit conduit. Most, if not all, of the salt not passed through the SSM as potable water, is retained in a second rententate which exits the SSM through a second retentate exit conduit 570 connected to the SSM for receipt of the second retentate. The first permeate is thus fractionated by the SSM into potable water and a second retentate, the salinity of the second retentate being greater than the salinity of the first permeate.

The three FSMs of this embodiment produce sufficient first permeate to feed the SSM continuously and produce an uninterruptable supply of potable water. Optionally, the first permeate may be collected in a first permeate feed tank (not shown) for withdrawal therefrom by the second stage pump to provide first permeate, as desired, to the SSM.

In this embodiment, the second retentate is introduced into the seawater feed for recycling through the FSMs 535A-C and the SSM 560 of the desalination system. The second retentate remains pressurized at between about 200 psi to about 300 psi and travels through the second retentate exit conduit 570 into a booster pump 575 connected thereto. The booster pump is selected to sufficiently pressurize and pump the second retentate to join the seawater feed in the first stage pump outlet conduit 530 through a booster pump outlet conduit 580 connected therebetween. Although it may vary from between about 15% and about 35%, the preferred volume of the second retentate is between 20% and 30% of the volume of the first permeate and is preferably about 7% to about 15% by volume of the seawater feed. Introduction of the second retentate into the pressurized seawater feed may be controlled by valving means, boost pump deactivation, or other control means known in the art. Optionally, the second retentate may be added without boosted pressure to the first stage pump inlet conduit.

Recycling of the second retentate provides advantageous energy savings since it only requires a pressure boost of about 200 psi to 350 psi, depending on its pressure exiting the SSM, to equal the preferred pressure of the pressurized seawater feed. Entry of fully pressurized second retentate into the pressurized seawater feed may displace the same volume of seawater feed that would otherwise require the energy necessary to pressurize it sufficiently from atmospheric. Additionally, should the second retentate be of lower salt concentration than the seawater feed, use of the second retentate for recycling will have a diluting effect thus likely prolonging use and extending maintenance periods of the membranes. The dilution effect also lowers the salt concentration of the pressurized seawater feed thereby providing for the lowering, if desired, of operating pressures and further energy savings.

In this embodiment, the first retentate is fractionated through a pair of high performance nanofiltration membranes to produce a dilute concentrate and a high concentrate, the dilute concentrate being of lower salinity than the first retentate and the seawater feed. The dilute concentrate may be introduced into the seawater feed to additionally dilute the seawater feed. Such dilution advantageously causes a reduced osmotic pressure in the FSMs and provides, if desired, for lowering the pressure of the pressurized seawater feed resulting in further energy savings. An additional advantage to introducing the dilute concentrate into the seawater feed is apparent when displacement of an equal portion of seawater feed with the dilute concentrate provides a higher yield of potable water from seawater.

Referring again to FIG. 5, the first retentate maintains most, if not all, of the pressure from the first stage pump 525 upon exit from the FSMs 535A-C into the first retentate exit conduits 545A-C respectively, and into the consolidated first retentate conduit 545 connected thereto. The first retentate is split downstream by a pair of concentrate inlets 546A and 546B terminating respectively into a pair of concentrate stage high performance nanofiltration membranes (CSM) 585A and 585B connected thereto. Although they may vary, in this embodiment, each of the CSMs is configured the same as the FSM and the SSM.

The first retentate is fractionated by the CSMs into dilute concentrates, which exit the CSMs at approximately atmospheric pressure through dilute concentrate exit conduits 590A and 590B respectively connected thereto, and pressurized high concentrates which exit the CSMs through high concentrate exit conduits 595A and 595B respectively connected thereto. The dilute concentrate outlet is terminally connected to the first pump inlet conduit 520 for receipt of the dilute concentrate into the seawater feed. From the high concentrate outlet conduits the high concentrates are forwarded to the energy recovery device 547 via the consolidated energy recovery device inlet 595 connected therebetween.

Performance of the present embodiment can be illustrated by way of the following example. Seawater at 35,000 mg/l salt is drawn from the seawater feed tank at the rate of about 12.9 gallons per minute and pressurized to about 530 psi via the first stage pump through the FSMs to yield a consolidated first permeate at approximately atmospheric pressure of about 7 gallons per minute at a concentration of about 4,200 mg/l or about 12% of the concentration of the seawater feed. The first permeate is then pressurized to about 300 psi and pumped via the second stage pump through the SSM to yield about 4.9 gallons per minute of potable water. The second retentate is produced at a rate of about 2.1 gallons per minute at a concentration of about 12,900 mg/l salt. The pressure of the second retentate is boosted preferably to between about 500 psi to about 550 psi and is introduced into the pressurized seawater feed.

By way of maintaining pressurization, the first retentate is pumped into the CSMs at about 10.5 gallons per minute at a salinity of about 46,000 mg/l. Although configurations may vary as desired, in the present embodiment, a pair of CSMs were provided to sufficiently receive the first retentate being roughly 60% of the volume of the seawater feed introduced into the three FSMs. The CSMs operate to fractionate the first rententate into about 8 gallons per minute of high concentrate at about 56,000 mg/l salt and about 2.5 gallons per minute of dilute concentrate at about 14,000 mg/l salt. Except for minor head losses, the high concentrate maintains pressure from the first stage pump and may be depressurized by the energy recovery device for further energy savings. Yield of dilute concentrate can be expected to be between about 10% and about 30% of the volume of first retentate input to the CSMs.

This yield is due in part to the increase in osmotic pressure due to the relatively higher concentration of the first retentate. By way of illustration, just to neutralize the osmotic pressure between the first retentate and the dilute concentrate requires at least about 330 psi.

For introduction into the seawater feed the dilute concentrate should be of lower salt concentration than the seawater feed. Preferably, the dilute concentrate should be between 30% to 50% of the concentration of the seawater feed.

In the present example, added to the seawater feed of 12.9 gallons per minute is about 2.5 gallons per minute of dilute concentrate at about 14,000 mg/l salt and about 2.1 gallons of second retentate at about 12,900 mg/l salt yielding about 4.9 gallons of potable water per minute.

Under the same conditions, and without the addition to the seawater feed of either the dilute concentrate or the second retentate, to obtain potable water at the same rate would require at least about 17.5 gallons per minute of seawater feed. By adding the dilute concentrate and the second retentate to the seawater feed, this example represents a yield rate of 38% potable water from the 12.9 gallons of seawater feed from the seawater tank, an improvement in yield rate of over 35%. The yield utilizing the present invention, however, may vary including exceeding a yield volume of 38% of potable water from an amount of seawater feed drawn from the seawater feed tank.

This embodiment provides additional advantages. The addition of the dilute concentrate and the second retentate lowers the concentration of the seawater feed to the FSMs and therefore lowers the osmotic pressure required to be overcome to produce the preferred first retentate. The concentration of the diluted seawater feed can be calculated as follows: (12.9 gpm×3.5% salt)+(2.5 gpm×1.4% salt)+(2.1 gpm×1.29% salt)=~ 2.9% (12.9 gpm+2.5 gpm+2.1 gpm)

In the present example, the salinity of the diluted seawater feed is 2.9% or 29,000 mg/l, about a 17% reduction in salinity from the undiluted seawater feed at 35,000 mg/l salt. Osmotic pressure at the FSMs is thus correspondingly reduced resulting, if desired, in substantially reduced operating pressure and further energy savings.

Having described only typical forms and applications of the present invention, it is not intended that the invention be limited to the specific details herein set forth. While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A system for desalinating seawater, comprising:
a pump configured for delivering filtered seawater having a total dissolved solids content of not less than 35,000 mg/l feed at a pressure of not more than 600 psi from a supply of seawater to a first desalination stage;
the first desalination stage consisting of one or more nanofiltration membranes arranged in series, said first desalination stage producing a first permeate and a first retentate, where the first permeate has a total dissolved solids content of no more than twelve percent compared with a total dissolved solids content of seawater immediately prior to entering said first stage desalination operation;
a fluid channel linking said first desalination stage to a second desalination stage and communicating said first permeate from said first desalination stage to said second desalination stage without further reduction in the total dissolved solids content of said first permeate; and
the second desalination stage configured to receive said first permeate consisting of one or more nanofiltration membranes arranged in series, said second desalination stage producing a second permeate and a second retentate, where the second permeate has a total dissolved solids content of no more than 500 mg/l.

2. The system for desalinating seawater of claim 1 where the first and second stage desalination stages utilize no more than five nanofiltration membranes for each stage.

3. The system for desalinating seawater of claim 1 further comprising recirculating means configured to deliver at least a portion of the second retentate to said filtered seawater entering said first desalination stage.

4. The system for desalinating seawater of claim 1 further comprising energy recovery means for recovering energy by depressurizing the first retentate.

5. The system for desalinating seawater of claim 1 further comprising energy recovery means for recovering energy by depressurizing the second retentate.

6. The system for desalinating seawater of claim 1 wherein a highest pressure realized in the system is no greater than five hundred psi.

7. The system for desalinating seawater of claim 1 wherein said fluid channel includes an intermediate pump for pressurizing the first permeate prior to being received by said second desalination stage.

8. The system for desalinating seawater of claim 7 wherein said intermediate pump pressurizes the first permeate to between two hundred psi and three hundred psi.

9. The system for desalinating seawater of claim 1 wherein the nanofiltration membranes are high performance nanofiltration membranes that reject over 99% of divalent ions and up to 90% of monovalent ions.

10. The system for desalinating seawater of claim 1 wherein each desalination stage comprises a plurality of high performance nanofiltration membranes linked in series.

11. The system for desalinating seawater of claim 1 further comprising an anti-scalant feed system coupled with the pump to enable anti-scaling solution to be delivered to the nanofiltration membranes.

* * * * *